US007423673B1

(12) United States Patent
Efrat et al.

(10) Patent No.: US 7,423,673 B1
(45) Date of Patent: Sep. 9, 2008

(54) METHOD AND SYSTEM FOR DETERMINING OPTICAL DISTORTION IN A TRANSPARENT MEDIUM

(75) Inventors: Ilan Efrat, Haifa (IL); Eliyahu Tell, Nesher (IL); Hanan Shamir, Haifa (IL)

(73) Assignee: Elbit Systems Ltd., Haifa (IL)

( * ) Notice: Subject to any disclaimer, the term of this patent is extended or adjusted under 35 U.S.C. 154(b) by 740 days.

(21) Appl. No.: 11/084,820

(22) Filed: Mar. 18, 2005

Related U.S. Application Data

(60) Provisional application No. 60/554,132, filed on Mar. 18, 2004.

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS

| | | | |
|---|---|---|---|
| 4,377,341 A | | 3/1983 | Task et al. |
| 4,461,570 A | | 7/1984 | Task et al. |
| 5,302,964 A | | 4/1994 | Lewins |
| 5,834,749 A | * | 11/1998 | Durbin ................. 235/454 |
| 5,940,537 A | | 8/1999 | Regen et al. |
| 6,618,081 B1 | * | 9/2003 | Harada et al. ........... 348/231.6 |
| 2005/0007477 A1 | * | 1/2005 | Ahiska ................. 348/335 |

OTHER PUBLICATIONS

AFAMRL-TR-81-21, Aircraft Transparency Optical Quality: New Methods of Measurements, Louis V. Genco, O.D., Lt Colonel, Harry L. Task, Ph.D., Feb. 1981.

* cited by examiner

*Primary Examiner*—James M Hannett
(74) *Attorney, Agent, or Firm*—Edwards Angell Palmer & Dodge LLP; Steven M. Jensen

(57) ABSTRACT

System for determining a distortion model for an optically distorting medium, the system including an image sensor located at an image acquisition position behind the optically distorting medium, and an image processor coupled with the image sensor, the image sensor acquiring an obstructed image of an object located substantially at infinity, when the optically distorting medium is located between the image sensor and the object in a line of sight connecting the image sensor and the object, the image sensor acquiring an unobstructed image of the object, when the optically distorting medium is absent from the line of sight, the image processor receiving information respective of the obstructed image and the unobstructed image from the image sensor, the image processor identifying a plurality of features in the unobstructed image, and a respective feature in the obstructed image for each of the identified features in the unobstructed image, thereby determining pairs of associated features, the image processor determining a distortion parameter for each of the pairs of associated features, the image processor determining a reference distortion model for the optically distorting medium, respective of the image acquisition position, according to the distortion parameters.

31 Claims, 10 Drawing Sheets

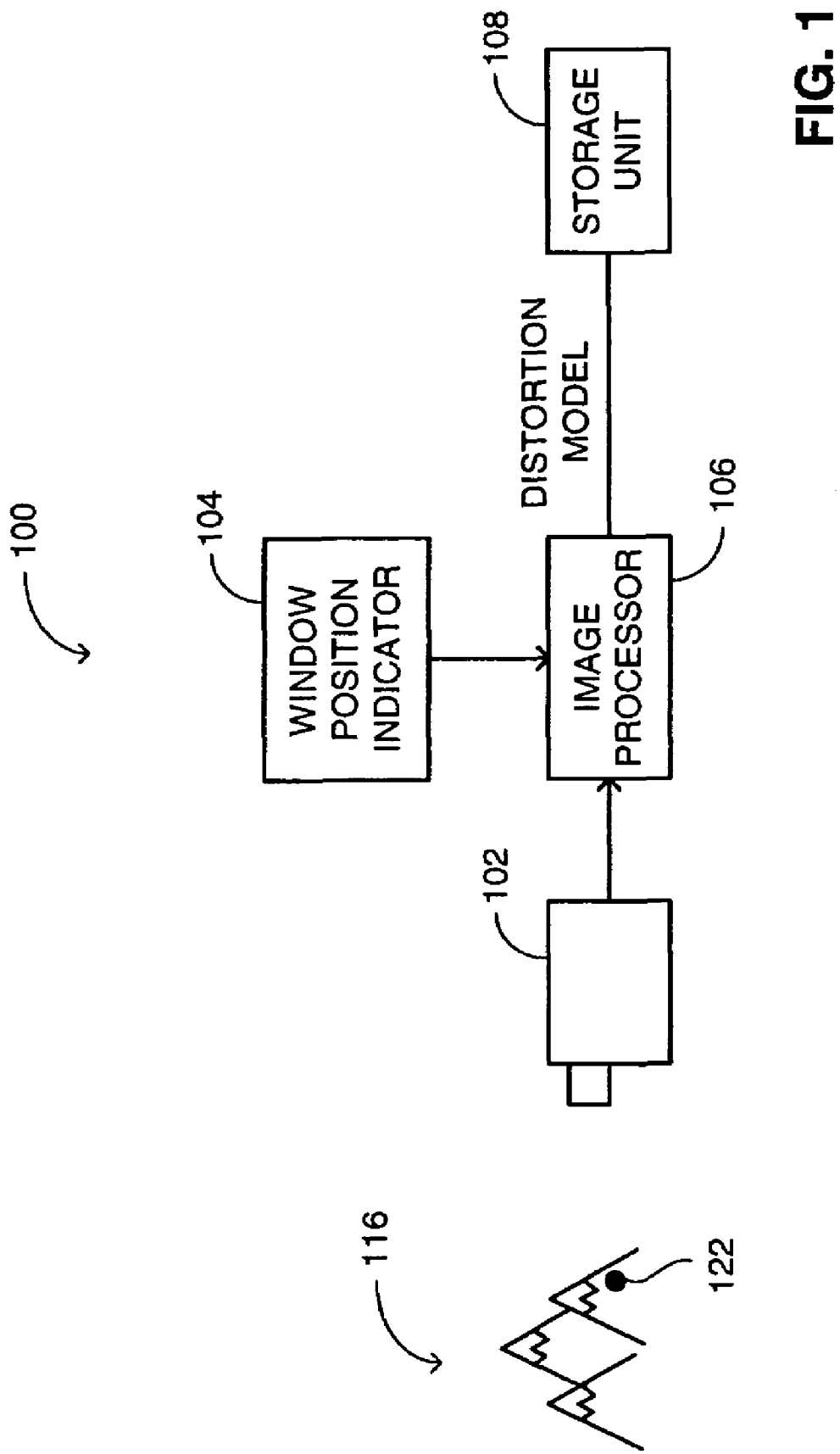

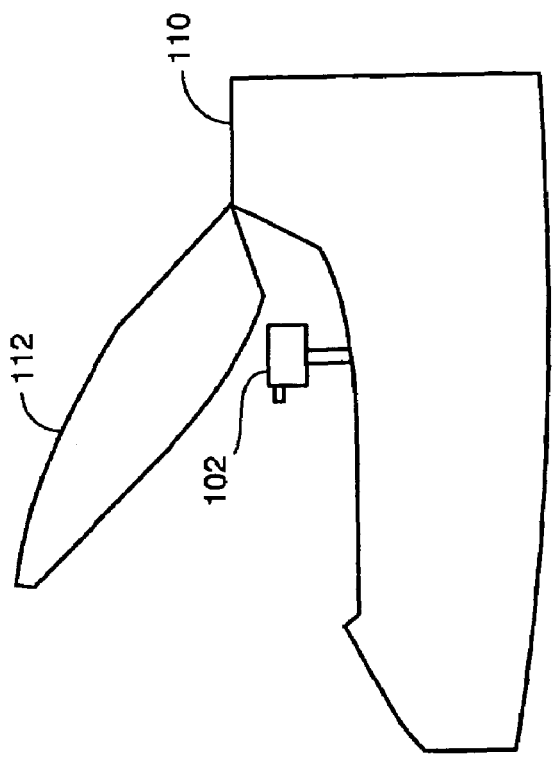
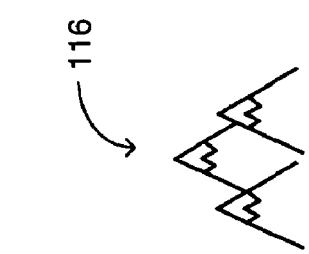
FIG. 2B
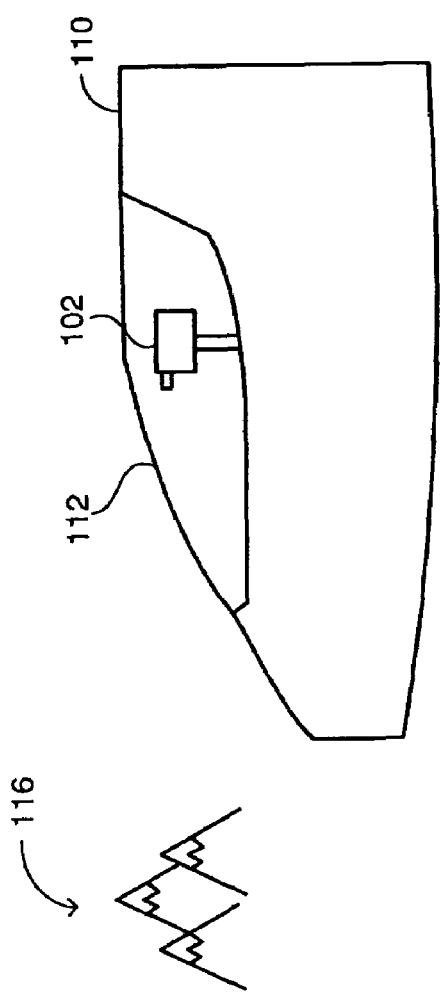
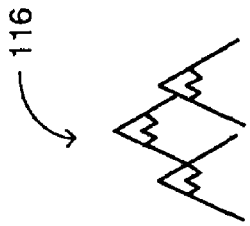
FIG. 2A

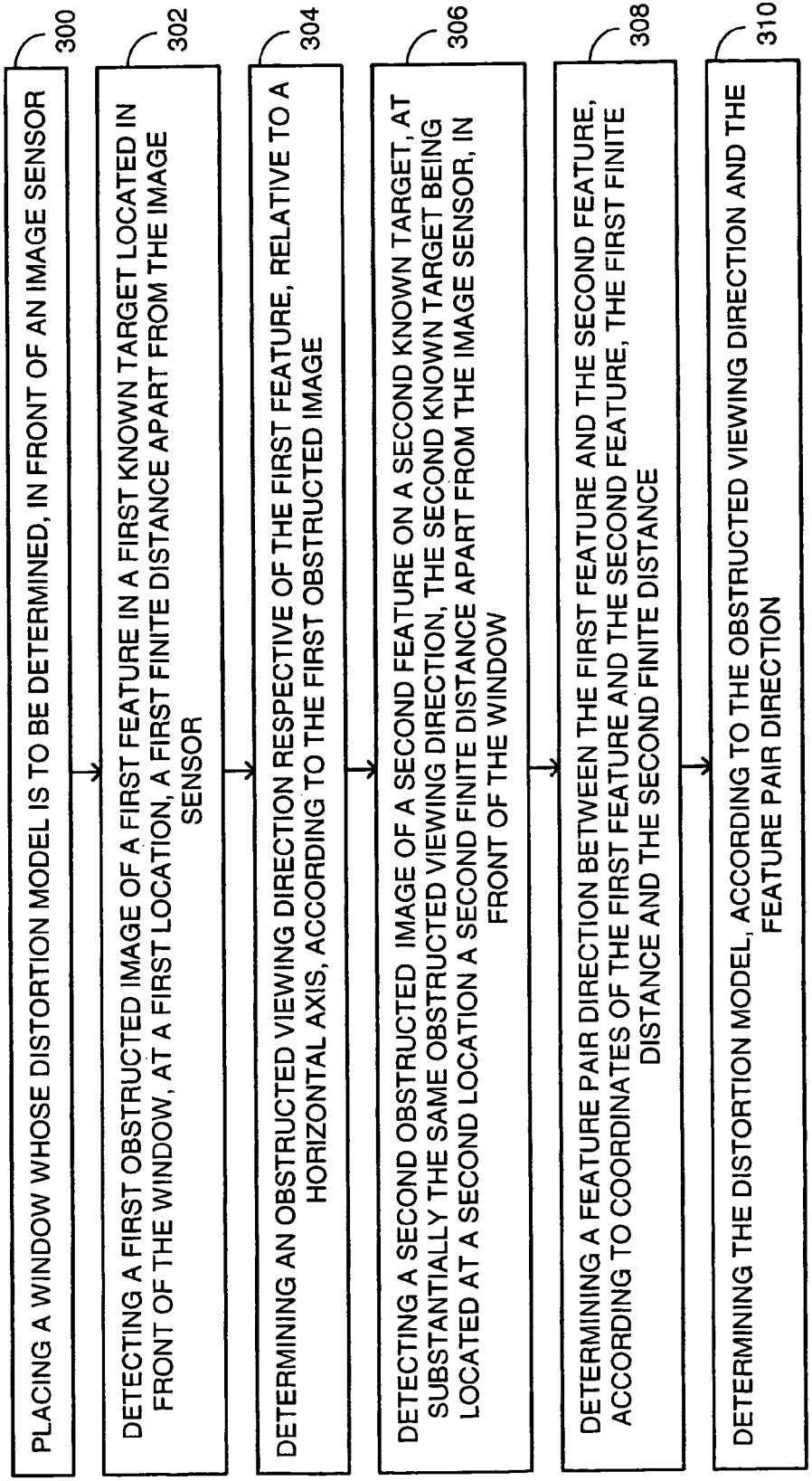

METHOD AND SYSTEM FOR DETERMINING OPTICAL DISTORTION IN A TRANSPARENT MEDIUM

CROSS-REFERENCE TO RELATED APPLICATIONS

This application claims the benefit under 35 U.S.C. §119 (e) of U.S. Provisional Application No. 60/554,132, filed Mar. 18, 2004, the entire contents of which are hereby incorporated by reference.

FIELD OF THE DISCLOSED TECHNIQUE

The disclosed technique relates to optical equipment in general, and to methods and systems for determining the distortions in an image which is viewed through a transparent material, in particular.

BACKGROUND OF THE DISCLOSED TECHNIQUE

In the recent years, many of the tasks which the pilot of an aircraft used to perform manually, are being performed by an on board system according to the direction of gaze of the pilot. For example, a camera mounted to the head of the pilot can register a target according to the gaze of the pilot. However, since the camera is located behind the canopy of the aircraft, the transparent canopy material deviates the light beam which is transmitted from the target to the camera.

This deviation however small, can have deleterious effects when the target is located far away. According to document AFAMRL-TR-81-21 described herein below, for each milliradian (mr) of error, the true position of the target is displaced from the apparent position thereof, by one foot for each 1000 feet of range. For example, a canopy which induces 10 mr of error, can move the apparent position of a target located 3000 feet away, a distance of 30 feet, more than enough to miss the target. Systems and methods for measuring the distortion caused by the canopy and for correcting for this distortion are known in the art.

U.S. Pat. No. 4,377,341 issued to Task et al., and entitled "System for Measuring Angular Deviation in a Transparency", is a directed to a system for measuring the angular deviation caused by an aircraft windscreen, according to the readings of a first linear detector device and a second linear detector device. The system includes an incandescent lamp, a condensing lens, a target slide, a projection lens, a receiving lens, a beam splitter, the first linear detector device and the second linear detector device.

The condensing lens is located between the incandescent lamp and the target slide. The projection lens is located between the target slide and the aircraft windscreen. The aircraft windscreen is located between the projection lens and the receiving lens. The target slide is an opaque material which includes a transparent "L" pattern, having a pair of transversely aligned linear segments. The projection lens collimates the image of the "L" pattern illuminated by the incandescent lamp and directs it toward the aircraft windscreen. The receiving lens collects the light transmitted by the aircraft windscreen, and directs it toward the beam splitter. The beam splitter divides the light to a first channel toward the first linear detector device and to a second channel toward the second linear detector device. In this manner, the first linear detector device detects a first segment of the pair of transversely aligned linear segments, and the second linear detector device detects a second segment of the pair of transversely aligned linear segments. The angular deviation is determined according to the relative locations of the first segment and the second segment, on the first linear detector device and the second linear detector device, respectively.

U.S. Pat. No. 4,461,570 issued to Task et al., and entitled "Method for Dynamically Recording Distortion in a Transparency", is directed to a system for making a qualitative photographic record of the degree of distortion of a transparency at a plurality of regions thereof. The system includes a support fixture, a test target, a controller, and a camera. The support fixture mounts to the transparency. The lens of the camera is located at a design eye behind the transparency, at a point where an occupant of a vehicle to which the transparency is attached, is stationed. The camera and the support fixture are fixed to the ground. A first drive means attached to the support fixture move the transparency relative to the camera, about a vertical axis, and a second drive means move the transparency about a horizontal axis. The controller is connected with the first drive means and the second drive means. The lens of the camera is located at the intersection of the vertical axis and the horizontal axis.

The test target includes a plurality of light sources arranged in a rectangular dot matrix target pattern. The test target is located in front of the transparency. The photographic recording is performed in a dark room. As the transparency is moved about a predetermined one of the axes through a predetermined angle or distance, a shutter of the camera is left open for the duration of the movement. If no distortion is present, the photographic record shows only the rectilinear array of the light sources. However, if distortion is present, then the photographic record shows distortion tracks. The distortion tracks indicate the varied angular deviations suffered by the light rays at different regions of the transparency.

U.S. Pat. No. 5,302,964 issued to Lewins and entitled "Heads-Up Display (HUD) Incorporating Cathode-Ray Tube Image Generator with Digital Look-Up Table for Distortion Correction", is directed to a HUD for displaying an image on a cathode-ray tube (CRT), by reversing the inherent distortion in the HUD. The HUD includes an electronic unit, the CRT, a combiner, a vector signal generator, a digital signal corrector, a horizontal digital to analog converter (DAC), and a vertical DAC. The electronic unit includes a radar unit, a plurality of sensors and a computer. The vertical signal generator includes a raster image generator section and a stroke image generator section. The digital signal corrector includes a horizontal axis look-up table memory and a vertical axis look-up table memory.

The vector signal generator is connected with the electronic unit and with the digital signal corrector. The vertical DAC and the horizontal DAC are connected with the digital signal corrector and with the CRT. The data generated by the radar unit and the sensors are fed to the computer. The computer feeds data to the vertical signal generator. The vertical signal generator generates a digital horizontal signal and a digital vertical signal, and feeds them to the digital signal corrector. The digital signal corrector generates a digital horizontal deflection signal and a digital vertical deflection signal, which are corrected for inherent distortions in the HUD. The horizontal DAC and the vertical DAC generate a horizontal analog deflection signal and a vertical analog deflection signal, respectively, according to the digital horizontal deflection signal and the digital vertical deflection signal, respectively.

The computer is programmed to alternately switch between a radar raster image and an information stroke image, such that both appear on the combiner, superimposed on a view through an aircraft windshield. The digital signal corrector is configured such that an image on the combiner as viewed from a predetermined angle, will appear undistorted. The digital signal corrector predistorts the digital horizontal deflection signal and the digital vertical deflection signal, in a manner which is the inverse of the inherent distortion in the HUD, such that the image on the combiner appears the same the one which would be generated according to the digital horizontal signal and digital vertical signal.

Document AFAMRL-TR-81-21 of the US Air Force Aerospace Medical Research Laboratory, by Louis V. Genco and Harry L. Task, February 1981, and entitled "Aircraft Transparency Optical Quality: New Methods of Measurement", is directed to methods and systems for measuring the distortion of an image transmitted by a transparency. The document describes methods for determining the distortion in a transparency, by analyzing grid board photographs. The grid board photograph is analyzed by determining the slope of grid lines, by measuring the lens factor or by digital processing.

In the grid line slope method, the enlarged photograph is fixed to a drafting board and aligned, such that the undistorted grid lines are horizontal. The slope of the lines photographed through the transparency are determined by drafting instruments, for several horizontal and vertical lines. In the lens factor method, a baseline measure is made of a baseline count of grid squares per inch, in an undistorted portion of the picture. Several transparency counts of grid squares per inch, are made for the grid areas photographed through the transparency. The most deviant of the transparency counts is compared with the baseline counts, by dividing the larger number by the smaller one.

In the digital processing method, an electronic digitizer is employed to sample salient portions of the photograph. The technician places a "bug" consisting of a cross hair under a magnifying lens, on a series of grid line intersections. When alignment has been achieved, he presses a button to record the position of the "bug". The digitized data are processed by a computer to yield lens factor and grid line slope without using drafting instruments.

The grid board photographs are made either by single exposure method or multiple exposure method. In the single exposure method, a photograph of a specified grid board is made with the transparency, camera and grid board at specified distances. A portion of the field of view includes an area of the grid board outside the area of the transparency. The distortion appears on the final photograph, as a bending or blurring of the grid lines. In the multiple exposure method, one exposure is made without the transparency in place and one with. The final photograph shows a plurality of lines, one set being undistorted and used as a reference, while the other set contains the distorted image.

SUMMARY OF THE DISCLOSED TECHNIQUE

It is an object of the disclosed technique to provide a novel method and system for producing a distortion model for an optically distorting medium.

In accordance with the disclosed technique, there is thus provided a system for determining a distortion model for an optically distorting medium. The system includes an image sensor located at an image acquisition position behind the optically distorting medium, and an image processor coupled with the image sensor.

The image sensor acquires an obstructed image of an object located substantially at infinity, when the optically distorting medium is located between the image sensor and the object, in a line of sight connecting the image sensor and the object. The image sensor acquires an unobstructed image of the object, when the optically distorting medium is absent from this line of sight.

The image processor receives information respective of the obstructed image and the unobstructed image from the image sensor. The image processor identifies a plurality of features in the unobstructed image, and a respective feature in the obstructed image, for each of the identified features in the unobstructed image. In this manner, the image processor determines pairs of associated features. The image processor determines a distortion parameter for each of the pairs of associated features, and a reference distortion model for the optically distorting medium, respective of the image acquisition position, according to the distortion parameters.

In accordance with another aspect of the disclosed technique, there is thus provided a method for determining a distortion model for an optically distorting medium. The method includes the procedures of identifying a plurality of features of an object in an obstructed image of the object, and identifying a respective feature in an unobstructed image of the object for each of the identified features, thereby determining pairs of associated features.

The method further includes the procedures of determining a distortion parameter for each of the pairs of associated features, and determining a reference distortion model for the optically distorting medium respective of the image acquisition position, according to the distortion parameters. The obstructed image is acquired from an image acquisition position behind the optically distorting medium. The object is located substantially at infinity, in front of the optically distorting medium. The unobstructed image is acquired from the image acquisition position.

In accordance with a further aspect of the disclosed technique, there is thus provided a method for determining a distortion model for an optically distorting medium. The method includes the procedures of detecting a first obstructed image of a first feature in a first known target located in front of the optically distorting medium, at a first location, a first finite distance apart from an image sensor located behind the optically distorting medium. The method further includes a procedure of determining an obstructed viewing direction respective of the first feature, relative to a horizontal axis, according to the first obstructed image.

The method further includes a procedure of detecting a second obstructed image of a second feature on a second known target, at substantially the same obstructed viewing direction, the second known target being located at a second location a second finite distance apart from the image sensor, in front of the optically distorting medium. The method further includes the procedures of determining a feature pair direction between the first feature and the second feature, according to coordinates of the first feature and the second feature, the first finite distance and the second finite distance, and determining the distortion model, according to the obstructed viewing direction and the feature pair direction.

BRIEF DESCRIPTION OF THE DRAWINGS

The disclosed technique will be understood and appreciated more fully from the following detailed description taken in conjunction with the drawings in which:

FIG. 1 is a schematic illustration of a system, for producing a reference distortion model for a window, as viewed from a predetermined position within a navigation compartment of a vehicle, the system being constructed and operative in accordance with an embodiment of the disclosed technique;

FIG. 2A is a schematic illustration of the navigation compartment of FIG. 1, with the window in a closed position;

FIG. 2B is a schematic illustration of the navigation compartment of FIG. 1, with the window in an open position;

FIG. 10 is a schematic illustration of a method for operating the system of FIG. 9.

DETAILED DESCRIPTION OF THE EMBODIMENTS

Figure 3:
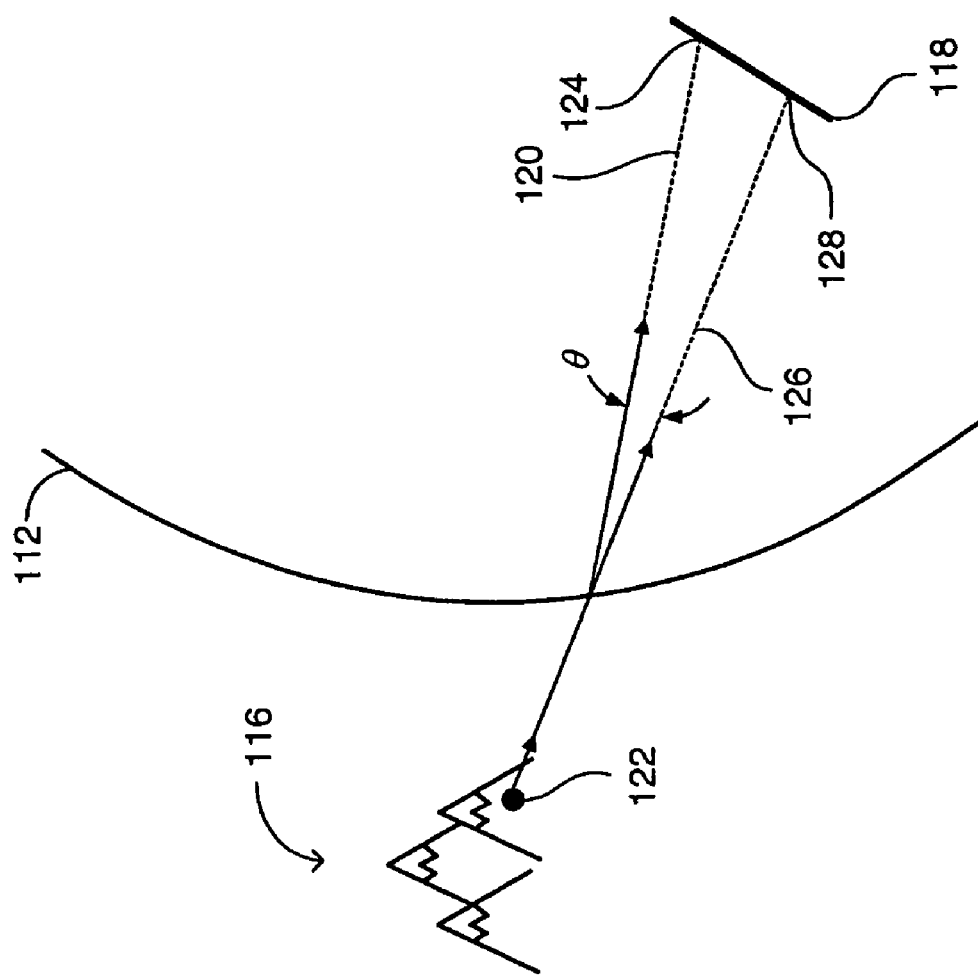
FIG. 3 is a schematic illustration of a ray tracing of light beams emanating from a feature of an object, and passing through the window of the system of FIG. 1, to strike the image detecting element of the image sensor of the system of FIG. 1.

The disclosed technique overcomes the disadvantages of the prior art by providing an image processor which identifies a feature in an image of an object taken with the canopy in place, and a respective feature in another image taken when the canopy is absent, and which produces a distortion model for the canopy, by determining the angle of deviation between the pair of identified features. Alternatively, a high-velocity distortion model can be produced while the aircraft is flying at such a velocity that the canopy physically distorts due to the air pressure, G-forces and the like. Alternatively, an in-flight distortion model can be produced while the aircraft is flying at such a velocity that the canopy physically distorts due to the air pressure. This in-flight distortion model is produced by acquiring an image of the object from a position where the distortion of the canopy is minimal, and another image from another position where distortion is substantial, and analyzing the two images as described herein above.

The term "object" herein below, refers to an object or a group of objects, which are substantially located at infinity, with respect to an image sensor. The term "vehicle" herein below, refers to ground vehicle (e.g., automobile, cargo vehicle, bus, motorcycle, tank, rail vehicle, armored vehicle, snowmobile), aircraft (e.g., airplane, rotorcraft, amphibian), marine vehicle (e.g., cargo vessel, resort ship, aircraft carrier, battle ship, submarine, motor boat, sailing boat), spaceship, spacecraft, observation post, and the like. The term "navigation compartment" herein below, refers to a compartment in which a pilot, a driver, a sailor, an astronaut, an observer, and the like, is situated to operate the vehicle.

The terms "window" herein below, refer to an optically distorting medium such as a canopy of an aircraft, a windshield of a ground vehicle, observation window of a marine vehicle, an observation post, a spacecraft, a spaceship, and the like. The term "motion box" herein below, refers to a volume within which the head and eyes of a user, such as a pilot, driver, sailor, and the like, move while operating a vehicle.

The term "reference distortion" herein below, refers to optical distortion of the window while the window is in a reference physical condition (e.g., while an aircraft is on the ground). The physical conditions can include physical parameters such as velocity, acceleration (e.g., G-forces), pressure, temperature, and the like. The term "reference distortion model" herein below, refers to a distortion model of the window which is produced respective of a set of reference physical conditions.

The term "dynamic distortion" herein below, refers to optical distortion of the window while the window is in a selected physical condition (e.g., while the aircraft is in flight). The term "dynamic distortion model" herein below, refers to a distortion model of the window which is produced respective of the selected physical condition. The term "dynamic distortion image" herein below, refers to an image which is detected while the window is in a selected physical condition. The term "position" of an object herein below, refers to either the location or the orientation of the object, or both the location and orientation thereof.

Reference is now made to FIGS. 1, 2A, 2B and 3. FIG. 1 is a schematic illustration of a system, generally referenced 100, for producing a reference distortion model for a window, as viewed from a predetermined position within a navigation compartment of a vehicle, the system being constructed and operative in accordance with an embodiment of the disclosed technique. FIG. 2A is a schematic illustration of the navigation compartment of FIG. 1, with the window in a closed position. FIG. 2B is a schematic illustration of the navigation compartment of FIG. 1, with the window in an open position. FIG. 3 is a schematic illustration of a ray tracing of light beams emanating from a feature of an object, and passing through the window of the system of FIG. 1, to strike the image detecting element of the image sensor of the system of FIG. 1.

With reference to FIG. 1, system 100 includes an image sensor 102, a window position indicator 104, an image processor 106 and a storage unit 108. Image processor 106 is coupled with image sensor 102, window position indicator 104 and with storage unit 108.

Image sensor 102 can be a near infrared (NIR) image intensifier tube, charge-coupled device (CCD) camera, light sensitive film camera, digital camera, and the like. With further reference to FIG. 2A, image sensor 102 is fixed within a navigation compartment 110. Window position indicator 104 is coupled with a hinge (not shown) of a window 112 of navigation compartment 110. Window position indicator 104 can be in form of a switch (e.g., mechanical switch, proximity switch, optical switch) which detects the obstructing and non-obstructing positions of window 112, and sends a respective signal to image processor 106. In the example illustrated in FIGS. 2A and 2B, navigation compartment 110 is a cockpit of an aircraft 114, and window 112 is a canopy of aircraft 114.

Image sensor 102 is fixed to navigation compartment 110 and located at an eye position (not shown) of a pilot (not shown) of aircraft 114, within a motion box (not shown) of navigation compartment 110. Image sensor 102 can acquire an image (not shown) of an object 116 located in front of navigation compartment 110. Object 116 is either located substantially at infinity, or light beams emitted there from are collimated. Window 112 is made of a substantially transparent material which substantially distorts the image of object 116 which is transmitted there through, toward image sensor 102.

With reference to FIGS. 2A, and 3, an image detecting element 118 of image sensor 102 receives a light beam 120 of a feature 122 of object 116 through window 112, at a location 124 on image detecting element 118. Image detecting element 118 detects an image (not shown) of object 116, by detecting other features (not shown) of object 116, and image sensor 102 sends a respective signal to image processor 106. Window position indicator 104 detects that window 112 is in an obstructing position and sends a respective signal to image processor 106. Hence, image processor 106 tags the detected image as an obstructed image (not shown) and stores the information respective of the obstructed image, in storage unit 108.

With reference to FIGS. 2B, and 3, image detecting element 118 receives a light beam 126 of feature 122, without any barriers in between, at a location 128 on image detecting element 118. Image detecting element 118 detects another image of object 116, by detecting other features of object 116 and image sensor 102 sends a respective signal to image processor 106. Window position indicator 104 detects that window 112 is in a non-obstructing position (i.e., window 112 is outside the field of view of image sensor 102), and sends a respective signal to image processor 106. Hence, image processor 106 tags the detected image as an unobstructed image (not shown) and stores the information respective of the unobstructed image, in storage unit 108.

Image processor 106 can include an image recognition module for processing each of the obstructed image and the unobstructed image. Image processor 106 identifies feature 122 (FIG. 1) of object 116 within the obstructed image. Image processor 106 identifies feature 122 also within the unobstructed image. In this manner, image processor 106 determines a pair of associated features (not shown) at locations 124 and 128. Image processor 106 registers the obstructed image with the unobstructed image, in the same coordinate system. Since the obstructed image is substantially distorted, the coordinates of feature 122 in the obstructed image are different than those in the unobstructed image. Image processor 106 determines the displacement between this pair of associated features (i.e., between locations 124 and 128) and determines an angle of deviation θ, between light beams 120 and 126, according to the distance of object 116 from image sensor 102, and the displacement between locations 124 and 128. Image processor 106 repeats the above procedure for the other features of object 116, which image sensor 102 observes.

Image processor 106 determines the displacement and therefore the angle of deviation between other pairs of associated features, located between the determined associated features, by interpolating between the determined associated features. Image processor 106 can perform for example, a polynomial interpolation, or a piecewise polynomial interpolation. In this manner, image processor 106 produces a reference distortion model for window 112 as viewed from an eye position within the motion box. It is noted that image processor 106 can operate either while image sensor 102 is detecting the features of object 116 (i.e., on-line), or after image sensor 102 detects these features (i.e., off-line).

It is noted that system 100 can include one or more optical elements, such as lens, reflector, collimator, prism, beam splitter, and the like, for directing the image of the object toward the image sensor. In this case, the image processor can make corrections to the image, due to distortions caused by these optical elements.

Figure 4:
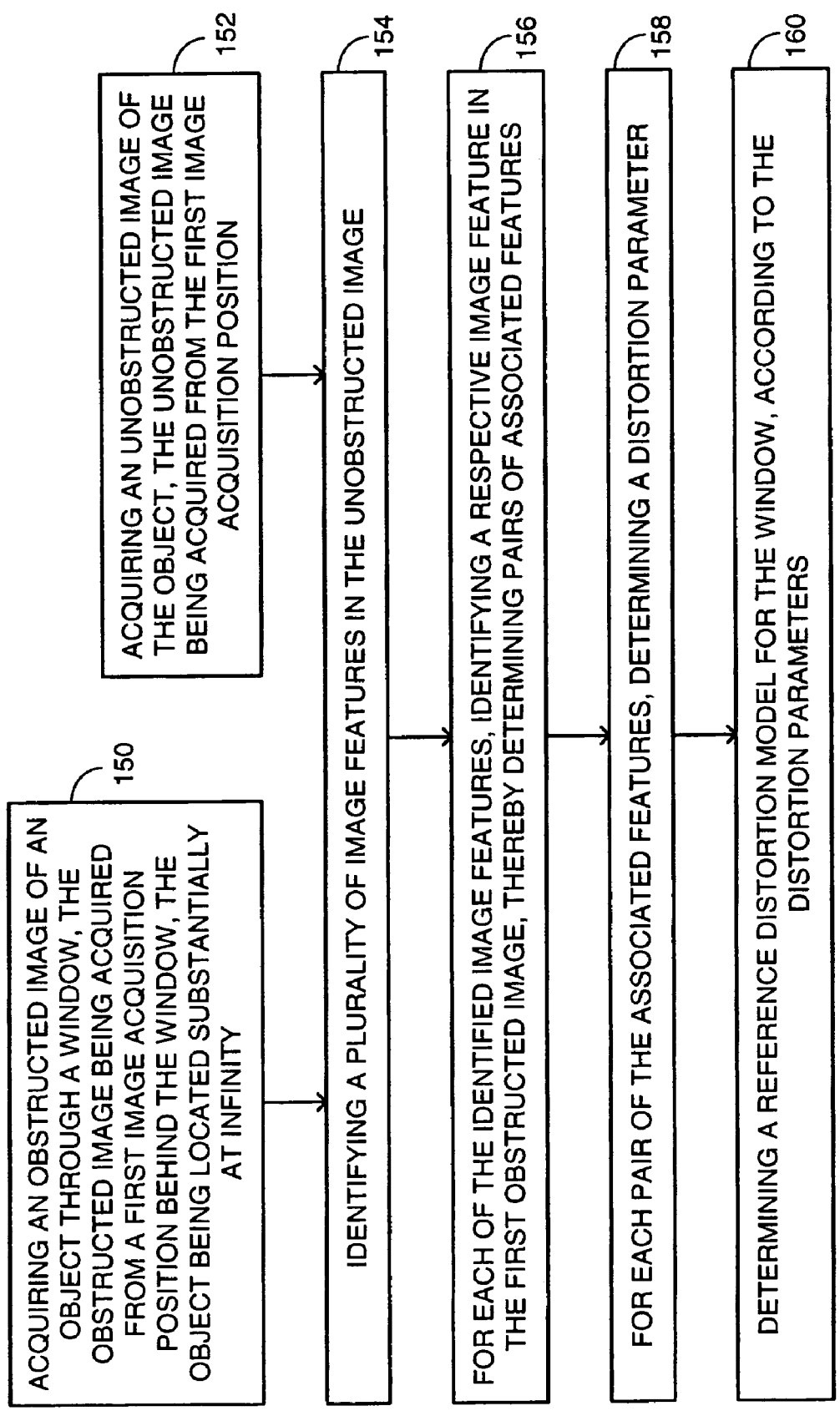
FIG. 4 is a schematic illustration of a method for operating the system of FIG. 1, operative in accordance with another embodiment of the disclosed technique.

Reference is now made to FIG. 4, which is a schematic illustration of a method for operating the system of FIG. 1, operative in accordance with another embodiment of the disclosed technique. In procedure 150, an obstructed image of an object is acquired through a window, the obstructed image being acquired from a first image acquisition position behind the window, the object being located substantially at infinity. With reference to FIG. 2A, image sensor 102 acquires an obstructed image of object 116, when window 112 is in an obstructed position (e.g., from behind a canopy of an aircraft on the ground).

In procedure 152, an unobstructed image of the object is acquired, the unobstructed image being acquired from the first image acquisition position. With reference to FIG. 2B, image sensor 102 acquires an unobstructed image of object 116, when window 112 is in a non-obstructing position, from the same location as in the case of procedure 150. It is noted that the order of procedures 150 and 152 is unimportant, as long as they are performed before procedure 154.

In procedure 154, a plurality of image features in the unobstructed image are identified. With reference to FIGS. 1 and 3, image processor 106 identifies feature 122 of object 116 in the unobstructed image, at location 128 on image detecting element 118. Image processor 106 further identifies other features of object 116 in the unobstructed image. In procedure 156, a respective image feature is identified in the obstructed image, for each of the identified image features, thereby determining pairs of associated features. With reference to FIGS. 1 and 3, image processor 106 identifies feature 122 in the obstructed image of object 116 at location 124, for the same feature identified in the unobstructed image at location 128, in procedure 154. Locations 124 and 128 together form a pair of associated features. Image processor 106 further identifies other pairs of associated features for other features of object 116.

In procedure 158, a distortion parameter is determined for each pair of the associated features. With reference to FIGS. 1 and 3, image processor 106 determines a distortion parameter between every pair of the associated features, in the unobstructed image and in the obstructed image. The distortion parameter can be for example, the displacement between locations 124 and 128, the angle of deviation θ between light beams 120 and 126, and the like. Image processor 106 determines a reference distortion model for window 112, according to the distortion parameters (procedure 160). Image processor 106 can perform procedures 154, 156, 158, and 160 either while procedures 150 and 152 are performed (i.e., on-line), or after procedures 150 and 152 are performed (i.e., off-line).

Figure 5:
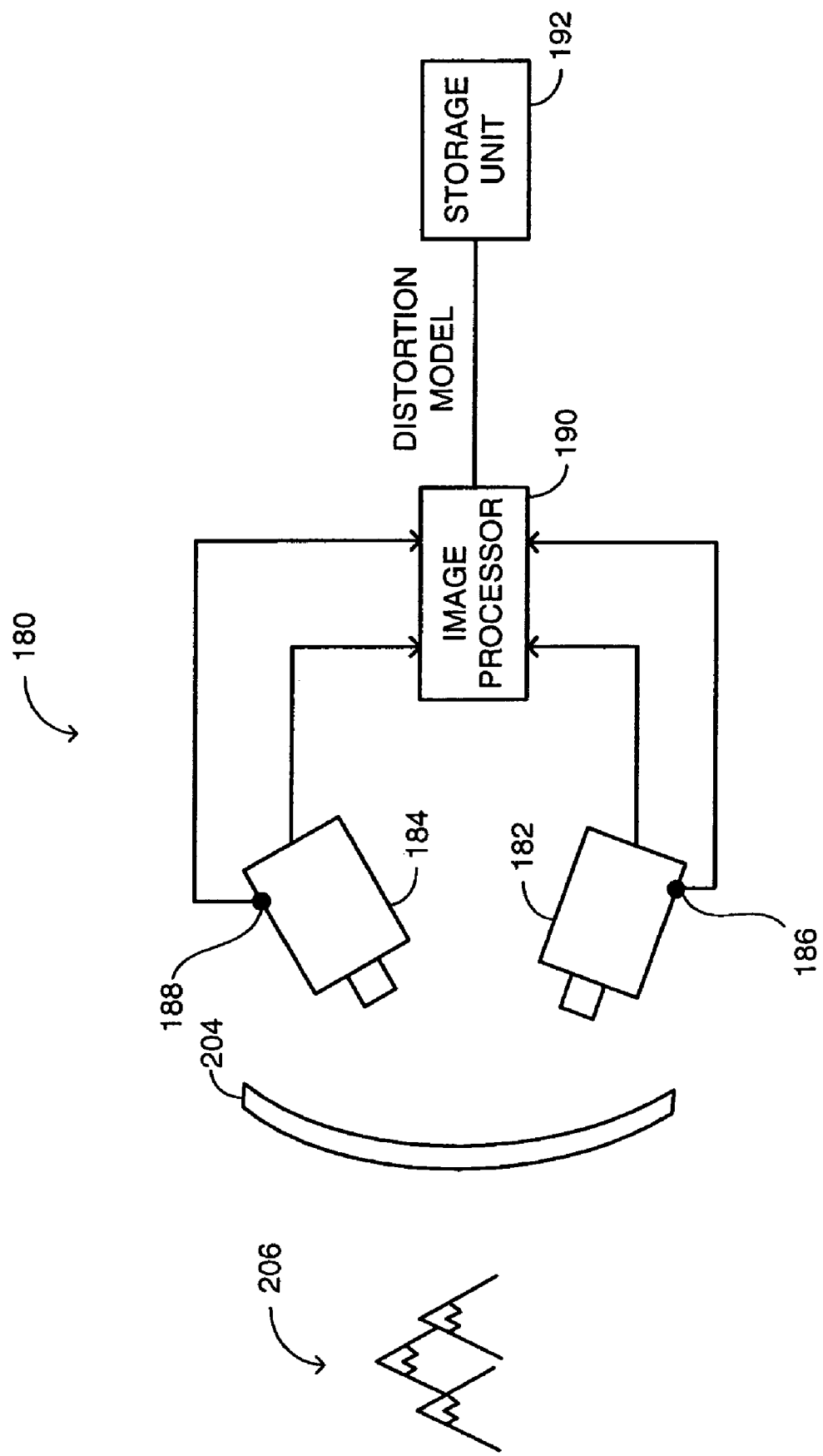
FIG. 5 is a schematic illustration of a system for producing a dynamic distortion model for a window, viewed from a selected image acquisition position of an image sensor, in a selected physical condition, the system being constructed and operative in accordance with a further embodiment of the disclosed technique.
Figure 6:
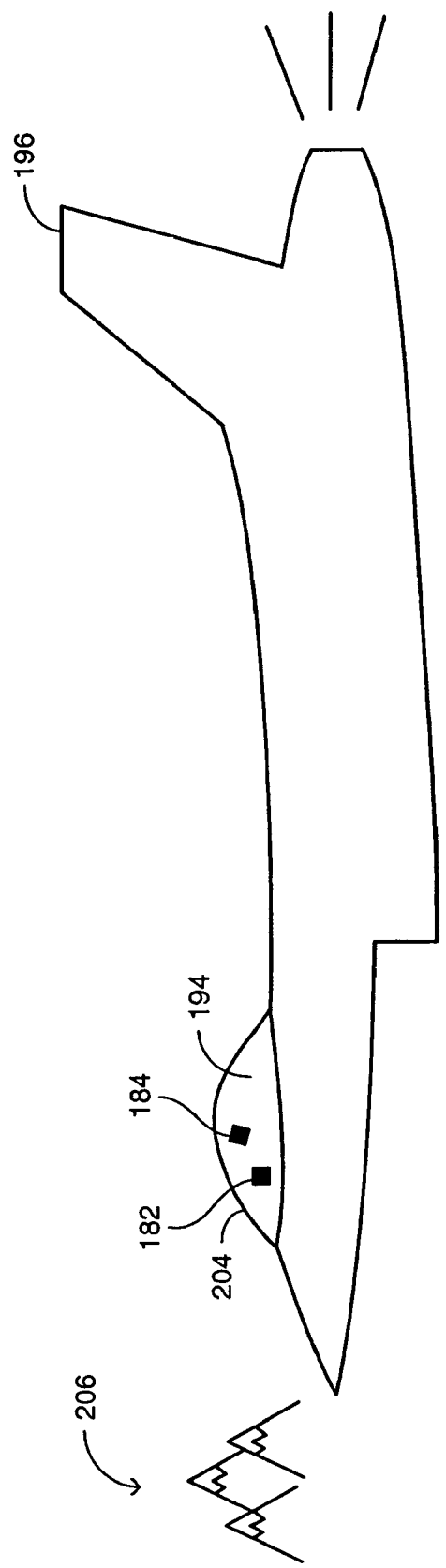
FIG. 6 is a schematic illustration of the two image sensors of the system of FIG. 5, located within a navigation compartment of a vehicle.
Figure 7:
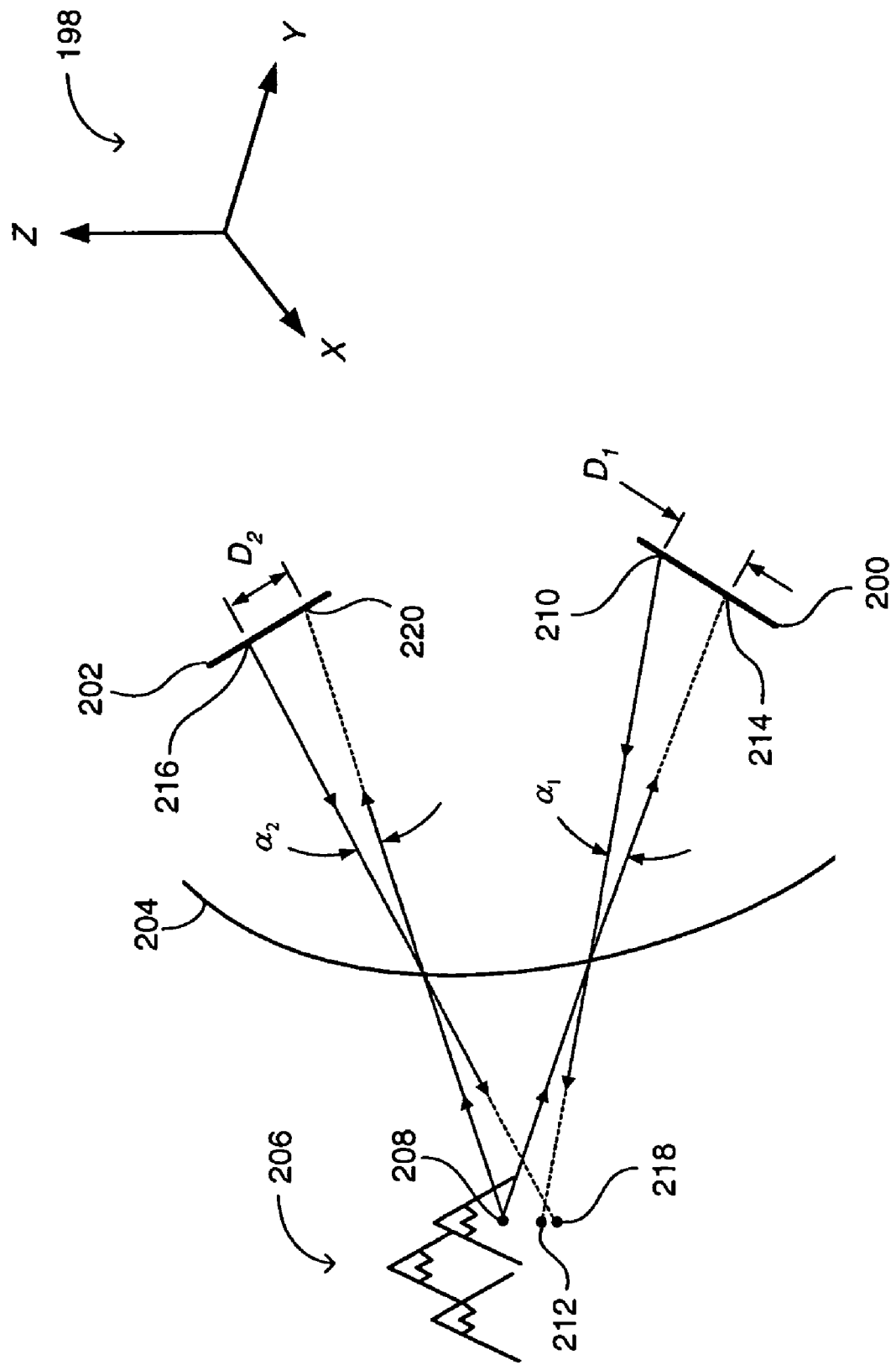
FIG. 7 is a schematic illustration of a ray tracing of light beams emanating from a feature of an object, and passing through the window of the system of FIG. 5, to strike the respective image detecting elements of each of the image sensors of the system of FIG. 5.

Reference is now made to FIGS. 5, 6, and 7. FIG. 5 is a schematic illustration of a system generally referenced 180, for producing a dynamic distortion model for a window, viewed from a selected image acquisition position of an image sensor, in a selected physical condition, the system being constructed and operative in accordance with a further embodiment of the disclosed technique. FIG. 6 is a schematic illustration of the two image sensors of the system of FIG. 5, located within a navigation compartment of a vehicle. FIG. 7 is a schematic illustration of a ray tracing of light beams emanating from a feature of an object, and passing through the window of the system of FIG. 5, to strike the respective image detecting elements of each of the image sensors of the system of FIG. 5.

With reference to FIG. 5, system 180 includes image sensors 182 and 184, position detectors 186 and 188, an image processor 190 and a storage unit 192. Image sensor 182 is fixed at a substantially known position within a navigation compartment 194 (FIG. 6) of an aircraft 196, in a coordinate system 198 (FIG. 7). Image sensor 182 views a region of navigation compartment 194 from this substantially known position, where navigation compartment 194 is connected to the fuselage (not shown) of aircraft 196 (FIG. 6). Therefore, the optical distortion of navigation compartment 194 at this region is substantially constant (i.e., the variation of the optical distortion are negligible) at a different physical conditions, and substantially the same as the reference distortion.

Image sensor 184 can be moved to various positions within a motion box (not shown) in navigation compartment 194, between each image acquisition process. Image processor 190 is coupled with image sensors 182 and 184, position detectors 186 and 188, and with storage unit 192. Position detectors 186 and 188 are coupled with image sensors 182 and 184, respectively, in order to determine the positions of image detecting elements 200 and 202 (FIG. 7) of image sensors 182 and 184, respectively, in coordinate system 198.

Each of position detectors 186 and 188 can employ a medium such as electromagnetic waves (e.g., light waves), and the like, in order to determine the position of image sensors 182 and 184, respectively. In this case, image sensor 184 is incorporated with the pilot (e.g., mounted on a helmet worn by the pilot). Alternatively, image sensor 184 can be a motorized pan and tilt system, in which case no position detector is employed.

With reference to FIGS. 5 and 7, a window 204 is located between an object 206 on one side, and image sensors 182 and 184 on the other. Object 206 is located substantially at infinity. Window 204 is for example, a canopy 208 of navigation compartment 194 of aircraft 196.

Each of image sensors 182 and 184 can be a near infrared (NIR) image intensifier tube, charge-coupled device (CCD) camera, light sensitive film camera, digital camera, and the like. System 180 can include a compiler (not shown) for converting the signal produced by either one of image sensors 182 and 184, to a common format recognized by image processor 190.

System 180 operates while window 204 is in a selected physical condition (e.g., during the flight of aircraft 196). However, prior to operation of system 180, a reference distortion model is determined for window 204 at an image acquisition position of image sensor 182, in a reference physical condition, by following the procedures of the method described herein above in connection with FIG. 4 (e.g., while aircraft 196 is on the ground).

Image processor 190 determines the relative positions of image sensors 182 and 184, according to the readings of position detectors 186 and 188. With reference to FIG. 7, image detecting element 200 detects an obstructed (i.e., distorted) image of a feature 208 of object 206 at a location 210 on image detecting element 200. Due to optical distortion of window 204, image sensor 182 perceives feature 208 to be at an imaginary location 212. Image processor 190 determines the apparent location of feature 208 according to the reference distortion model of window 204 respective of the image acquisition position of image sensor 182. Image processor 190 further determines that an unobstructed image of feature 208 would be detected at a location 214 on image detecting element 200. Image processor 190 can determine a displacement $D_1$ between locations 210 and 214, and a corresponding angle of deviation $\alpha_1$.

During calibration of system 180, while flying at a set of different physical conditions (e.g., different air speeds), the orientation of image sensor 184 is changed relative to that of image sensor 182, and image sensor 184 acquires a plurality of images of object 206, through different regions of window 204. Image processor 190 produces a plurality of distortion models for different regions of window 204, at different physical conditions and at different orientations of image sensor 184. Image detecting element 202 detects an obstructed (i.e., distorted) image of feature 208 at a location 216 on image detecting element 202. Due to optical distortion of window 204, image sensor 184 perceives feature 208 to be at an imaginary location 218. Image processor 190 determines the apparent location of feature 208 according to the relative position between the positions of image sensors 182 and 184. Image processor 190 further determines that an unobstructed image of feature 208 would be detected at a location 220 on image detecting element 202. Image processor 190 determines a displacement $D_2$ between locations 216 and 220, and a corresponding angle of deviation $\alpha_2$, thereby determining a dynamic distortion model for window 204 at an image acquisition position of image sensor 184.

System 180 can be operated for image sensor 182 remaining substantially at the same image acquisition position, and image sensor 184 positioned at other image acquisition positions, thereby determining a plurality of dynamic distortion models for window 204 in the selected physical condition, with respect to different image acquisition positions.

Figure 8:
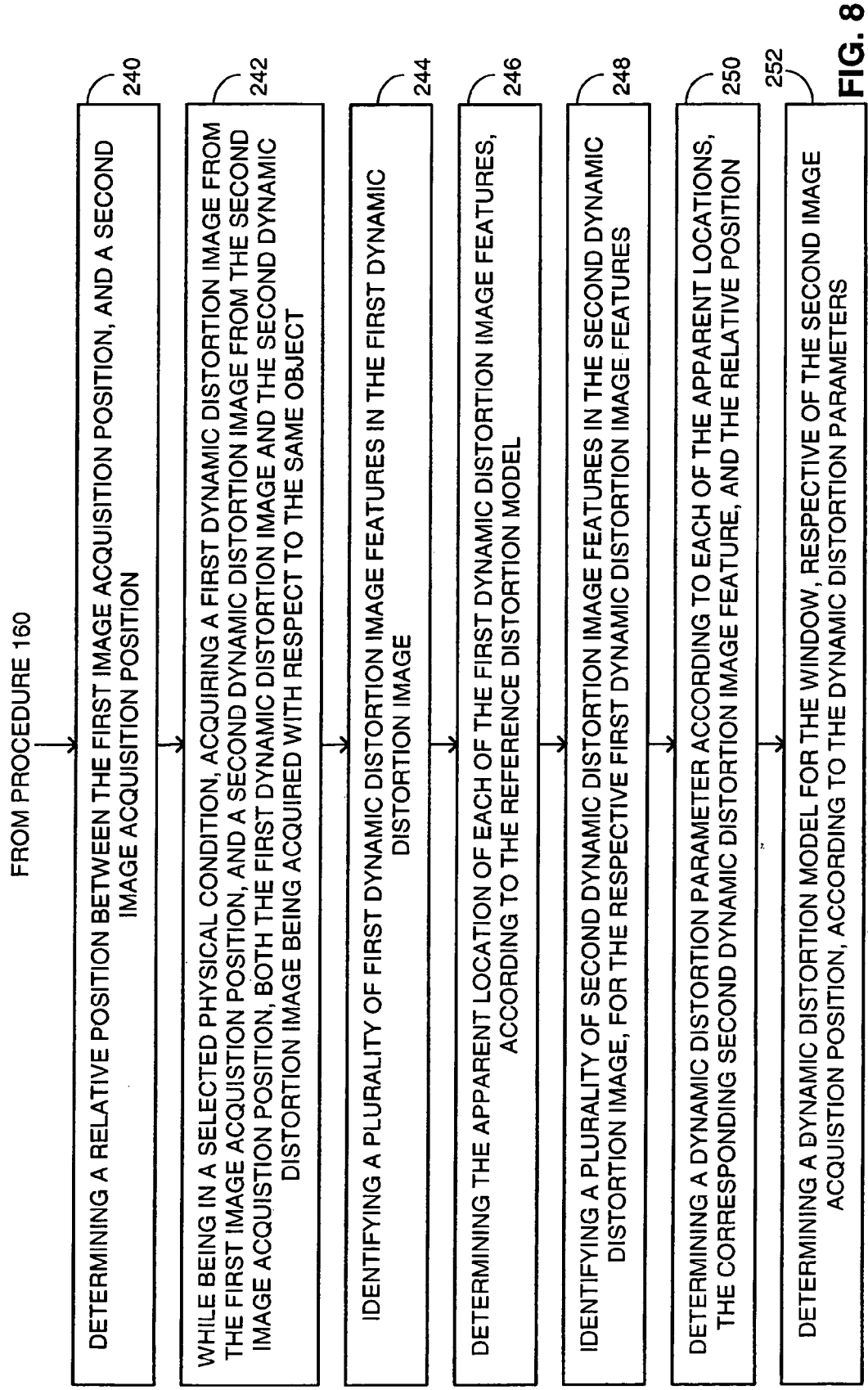
FIG. 8 is a schematic illustration of a method for operating the system of FIG. 5, after performing the method of FIG. 4, the method of FIG. 5 being operative in accordance with another embodiment of the disclosed technique.

Reference is now made to FIG. 8, which is a schematic illustration of a method for operating the system of FIG. 5, after performing the method of FIG. 4, the method of FIG. 5 being operative in accordance with another embodiment of the disclosed technique. In procedure 240, a relative position between the first image acquisition position and a second image acquisition position is determined. With reference to FIG. 5, image processor 190 determines the relative position between image acquisition positions of image sensors 182 and 184.

In procedure 242, while being in a selected physical condition, a first dynamic distortion image is acquired from the first image acquisition position, and a second dynamic distortion image is acquired from the second image acquisition position, both the first dynamic distortion image and the second dynamic distortion image being acquired with respect to the same object. With reference to FIG. 7, image detecting element 200 of image sensor 182 detects an obstructed image of object 206, and image detecting element 202 of image sensor 184 detects another obstructed image of object 206.

In procedure 244, a plurality of first dynamic distortion image features are identified in the first dynamic distortion image. With reference to FIGS. 5 and 7, image processor 190 identifies feature 208 at location 210 in the image acquired by image detecting element 200 in procedure 242. Image processor 190 identifies additional features of object 206 at other locations in the image acquired by image detecting element 200.

In procedure 246, an apparent location of each of the first dynamic distortion image features is determined, according to the reference distortion model. With reference to FIGS. 5 and 7, due to the optical distortion of window 204, image detecting element 200 perceives feature 208 to be at location 212 adjacent to the actual location of feature 208. However, with the aid of the reference distortion model which is determined for window 204 with respect to the image acquisition position of image sensor 182, image processor 190 determines the apparent location of feature 208 and associates this apparent location with location 214 on the image acquired by image detecting element 200 in procedure 242. Image processor 190 performs this procedure respective of additional features of object 206.

In procedure 248, a plurality of second dynamic distortion image features is identified in the second dynamic distortion image, for the respective first dynamic distortion image features. With reference to FIGS. 5 and 7, image processor 190 identifies feature 208 at location 216 in the image acquired by image detecting element 202 in procedure 242, corresponding to location 210 in the image acquired by image detecting element 200. Image processor 190 identifies additional features of object 206 at other locations in the image acquired by image detecting element 202, corresponding to additional locations in the image acquired by image detecting element 200.

In procedure 250, a dynamic distortion parameter is determined according to each of the apparent locations, the corresponding second dynamic distortion image feature, and the relative position. With reference to FIGS. 5 and 7, due to the optical distortion of window 204, image detecting element 202 perceives feature 208 to be at location 218 adjacent to the actual location of feature 208. However, according to the relative position between image sensors 182 and 184 which was determined in procedure 240, image processor 190 determines the apparent location of feature 208 and associates this apparent location with location 220 on the image acquired by image detecting element 202 in procedure 242. Image processor 190 performs this procedure respective of additional features of object 206.

In this manner, image processor 190 determines a distortion parameter, such as displacement $D_2$ between locations 216 and 220, deviation angle $\alpha_2$, and the like, respective of the apparent location of feature 208 and location 216. Image processor 190 determines distortion parameters with respect to additional features of object 206.

In procedure 252, a dynamic distortion model is determined for the window, respective of the second image acquisition position, according to the dynamic distortion parameters. With reference to FIGS. 5 and 7, image processor 190 determines a dynamic distortion model for window 204, respective of the image acquisition position of image sensor 184, according to the dynamic distortion parameters determined in procedure 250.

In accordance with another aspect of the disclosed technique, a distortion model of a window is determined by employing two targets located at finite distances in front of the window (i.e., the light beams reaching the image sensor from different features of the targets are not quite parallel, as in the case of targets located at infinity). The distortion model is determined according to the angle of deviation of a plurality of respective features on the two targets, which are determined according to a ray tracing of these features. It is noted that this method can be employed in a restricted space (e.g., a hangar), where open space is at a premium and the targets can not be placed very far from the window.

Figure 9:
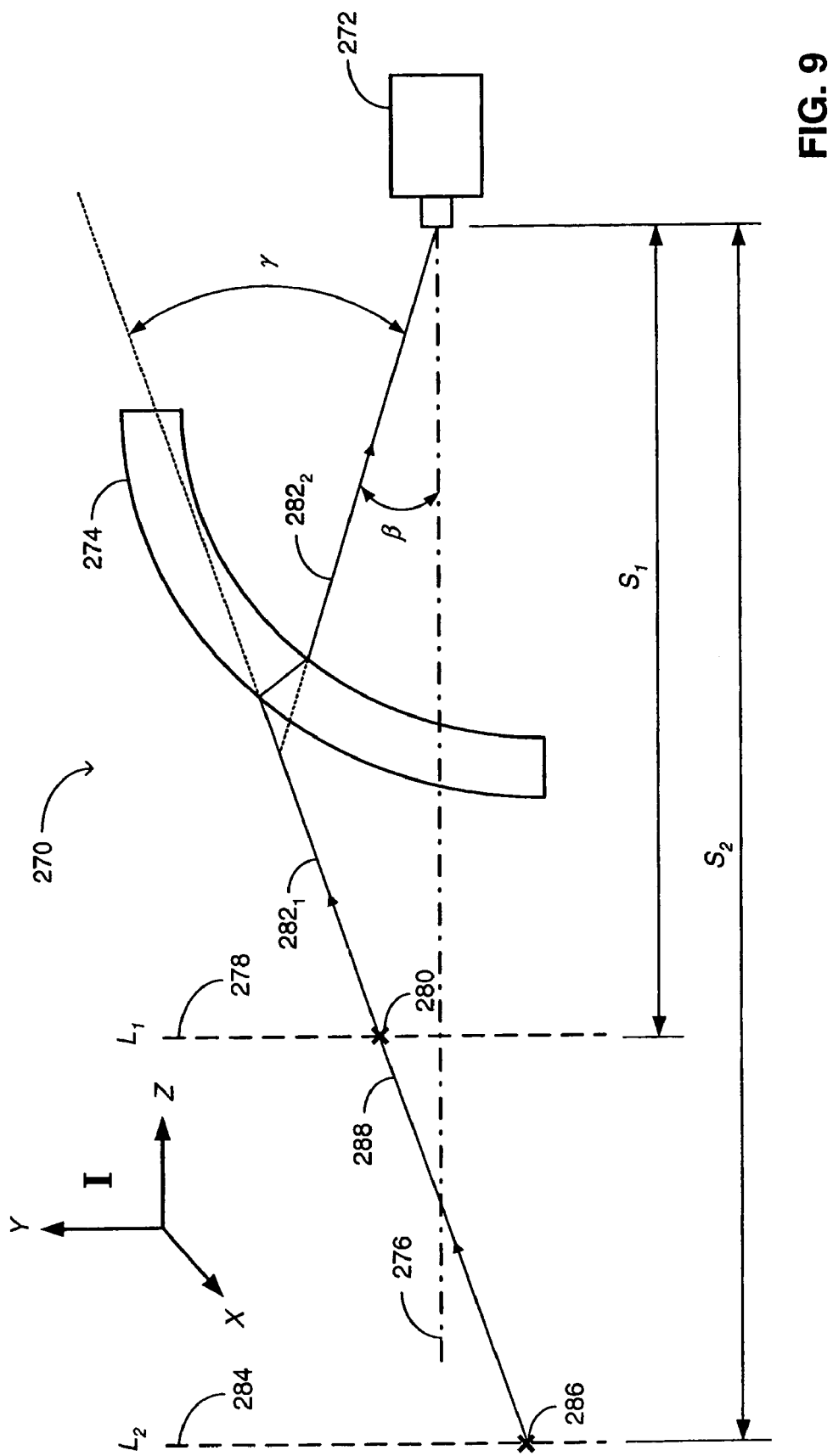
FIG. 9 is a schematic illustration of a system for determining a distortion model of a window, by detecting images of selected features of tow targets located in front of the window, at finite distances from an image sensor, constructed and operative in accordance with a further embodiment of the disclosed technique.

Reference is now made to FIGS. 9 and 10. FIG. 9 is a schematic illustration of a system generally reference 270, for determining a distortion model of a window, by detecting images of selected features of tow targets located in front of the window, at finite distances from an image sensor, constructed and operative in accordance with a further embodiment of the disclosed technique. FIG. 10 is a schematic illustration of a method for operating the system of FIG. 9.

System 270 includes an image sensor 272, a window 274, an image processor (not shown), and a storage unit (not shown). Image sensor 272, window 274, the image processor and the storage unit are similar to image sensor 102 (FIG. 1), window 112 (FIG. 2A), image processor 106, and storage unit 108, respectively, as described herein above. The image processor is coupled with image sensor 272, and with the storage unit. Image sensor 272 is placed behind window 274 (procedure 300 of FIG. 10). A horizontal axis is referenced 276.

In procedure 302, a first obstructed image of a first feature in a first known target is detected, the first known target being located in front of the window, at a first location, a first finite distance apart from the image sensor. With reference to FIG. 9, a target 278 is located at a location $L_1$ in front of window 274, at a finite distance $S_1$ from image sensor 272. Target 278 is located along a plane (not shown) substantially perpendicular to horizontal axis 276. Image sensor 272 detects an image of a feature 280 on target 278, through window 274. The coordinates of different features of target 278, such as that of feature 280, are known in a coordinate system I. The image processor stores the values of the coordinates of feature 280 along the X and Y axes of coordinate system I, and distance $S_1$ along the Z axis of coordinate system I, in the storage unit.

In procedure 304, an obstructed viewing direction respective of the first feature is determined relative to a horizontal axis, according to the first obstructed image. With reference to FIG. 9, a light beam $282_1$ reflects from feature 280 of target 278, light beam $282_1$ is deviated by window 274, and reaches image sensor 272 as a light beam $282_2$. The image processor determines the direction of light beam $282_2$ relative to horizontal axis 276, for example, according to an index of a pixel (not shown) of an image detecting element (not shown) of image sensor 272, which detects an obstructed image of feature 280 through window 274, while target 278 is located at location $L_1$. The image processor stores the value of this direction in coordinate system I, referenced by an angle $\beta$, in the storage unit.

In procedure 306, a second obstructed image of a second feature on a second known target is detected, at substantially the same obstructed viewing direction, the second known target being located at a second location a second finite distance apart from the image sensor, in front of the window. With reference to FIG. 9, a target 284 is located at a location $L_2$ in front of window 274, a finite distance $S_2$ from image sensor 272. Image sensor 272 detects an image of a feature 286 in target 284, through window 274, substantially at the same angle $\beta$. Target 284 at location $L_2$ is located on a plane (not shown), substantially perpendicular to horizontal axis 276. The coordinates of different features of target 284, such as that of feature 286, are known in coordinate system I.

A light beam 288 reflected from feature 286 at location $L_2$ travels in the direction of light beam $282_1$, light beam 288 is deviated by window 274 substantially the way light beam $282_1$ is deviated, and light beam 288 travels in the direction of light beam $282_2$ to reach the image detecting element of image sensor 272. The image processor stores the values of the coordinates of feature 286 along the X and Y axes of coordinate system I, and distance $S_2$ along the Z axis of coordinate system I, in the storage unit. The image processor stores the values of these coordinates in the storage unit, when the image processor determines that the same pixel of image sensor 272 which detected feature 280 in procedure 302, is now detecting feature 286. It is noted that targets 278 and 284 can be the same target which is moved from location $L_1$ to location $L_2$.

In procedure 308, a feature pair direction between the first feature and the second feature is determined, according to the coordinates of the first feature and the second feature, the first finite distance and the second finite distance. With reference to FIG. 9, the image processor determines the direction of light beam 288 (which is substantially the same as that of light beam $282_1$), in coordinate system I, according to the coordinates of features 280 and 286, and the distances $S_1$ and $S_2$.

In procedure 310, the distortion model is determined, according to the obstructed viewing direction and the feature pair direction. With reference to FIG. 9, the image processor determines the value of an angle of deviation γ (i.e., the angle between light beams $282_1$ and $282_2$), according to the direction of light beam $282_2$ determined in procedure 304, and the direction of light beam $282_1$ determined in procedure 308.

The image processor determines a distortion model for window 274, by repeating the above procedures for other features of targets 278 and 284. First, image sensor 272 acquires a first set of images of a first set of features of target 278 at location $L_1$, the image processor registers a set of obstructed viewing directions, and then image sensor 272 acquires a second set of images of a second set of features of target 284 at location $L_2$, corresponding to the respective obstructed viewing directions. The image processor determines the directions between every pair of features at the two locations, and determines the distortion model for window 274, according to each direction between every pair of features, and the corresponding obstructed viewing direction.

The coordinates of the second set of features can be found by interpolating between a set of known coordinates. Generally, the distortion model is determined for a subset of pixels of image sensor 272. The distortion model for unknown pixels can be determined by interpolating between the known pixels.

It will be appreciated by persons skilled in the art that the disclosed technique is not limited to what has been particularly shown and described hereinabove. Rather the scope of the disclosed technique is defined only by the claims, which follow.

The invention claimed is:

1. System for determining a distortion model for an optically distorting medium, the system comprising:
a first image sensor located at a first image acquisition position behind said optically distorting medium, said first image sensor acquiring a first obstructed image of an object located substantially at infinity, when said optically distorting medium is located between said first image sensor and said object in a line of sight connecting said first image sensor and said object, said first image sensor acquiring an unobstructed image of said object, when said optically distorting medium is absent from said line of sight; and
an image processor coupled with said first image sensor, said image processor receiving information respective of said first obstructed image and said unobstructed image from said first image sensor, said image processor identifying a plurality of first features in said unobstructed image, and a respective first feature in said first obstructed image for each of said identified first features in said unobstructed image, thereby determining pairs of associated features, said image processor determining a first distortion parameter for each of said pairs of associated features, said image processor determining a reference distortion model for said optically distorting medium, respective of said first image acquisition position, according to said first distortion parameters.

2. The system according to claim 1, further comprising a storage unit coupled with said image processor.

3. The system according to claim 1, further comprising a position indicator coupled with said image processor, said position indicator indicating when said optically distorting medium is present in said line of sight, and when said optically distorting medium is absent from said line of sight.

4. The system according to claim 1, further comprising an analog to digital converter coupled with said first image sensor and with said image processor, said analog to digital converter converting a signal produced by said first image sensor, from analog format to digital format.

5. The system according to claim 1, wherein said image processor comprises an image recognition module for identifying said first pairs of associated features.

6. The system according to claim 1, wherein said optically distorting medium is selected from the list consisting of:
canopy of an aircraft;
windshield of a ground vehicle;
observation window of a marine vehicle;
observation window of an observation post;
observation window of a spacecraft; and
observation window of a spaceship.

7. The system according to claim 1, wherein said first image sensor is selected from the list consisting of:
near infrared image intensifier tube;
digital camera;
charge-coupled device; and
light sensitive film.

8. The system according to claim 1, wherein said first image sensor is located at an eye position of a pilot of an aircraft, within a motion box of a cockpit of said aircraft.

9. The system according to claim 1, wherein said image processor operates in a mode selected from the list consisting of:
on-line; and
off-line.

10. The system according to claim 1, wherein said first distortion parameter is selected from the list consisting of:
displacement; and
angle of deviation.

11. The system according to claim 1, wherein said first image acquisition position is substantially within a motion box of an operator of a vehicle.

12. The system according to claim 1, further comprising a second image sensor located at a second image acquisition position behind said optically distorting medium, said image processor determining a relative position between a first image acquisition position of said first image sensor and a second image acquisition position of said second image sensor, said first image sensor acquiring a second obstructed image while said optically distorting medium is in a selected physical condition, said second image sensor acquiring a third obstructed image while said optically distorting medium is in said selected physical condition, both said second obstructed image and said third obstructed image being acquired respective of the same object, said image processor identifying a plurality of second features in said second obstructed image, said image processor determining the apparent location of each of said second features according to said reference distortion model, said image processor identifying a plurality of third features in said third obstructed image for respective ones of said second features, said image processor determining a second distortion parameter according to each of said apparent locations, respective ones of said third features, and said relative position, said image processor determining a dynamic distortion model for said optically distorting medium, respective of said second image acquisition position, according to said second distortion parameters.

13. The system according to claim 12, wherein said second image acquisition position is substantially within a motion box of an operator of a vehicle.

14. The system according to claim 12, wherein said selected physical condition exhibits at least one item selected from the list consisting of:
   velocity;
   acceleration;
   pressure; and
   temperature.

15. The system according to claim 1, further comprising:
   a first position detector coupled with said first image sensor, said first position detector detecting said first image acquisition position; and
   a second position detector coupled with said second image sensor, said second position detector detecting said second image acquisition position.

16. Method for determining a distortion model for an optically distorting medium, the method comprising the procedures of:
   identifying a plurality of first features of an object in a first obstructed image of said object, said first obstructed image being acquired from a first image acquisition position behind said optically distorting medium, said object being located substantially at infinity, in front of said optically distorting medium;
   identifying a respective first feature in an unobstructed image of said object for each of said identified first features, thereby determining pairs of associated features, said unobstructed image being acquired from said first image acquisition position;
   determining a first distortion parameter for each of said pairs of associated features; and
   determining a reference distortion model for said optically distorting medium respective of said first image acquisition position, according to said first distortion parameters.

17. The method according to claim 16, further comprising a preliminary procedure of acquiring said first obstructed image.

18. The method according to claim 16, further comprising a preliminary procedure of acquiring said unobstructed image.

19. The method according to claim 16, further comprising a preliminary procedure of acquiring said first obstructed image and said unobstructed image.

20. The method according to claim 16, wherein said procedures of identifying said first features, identifying said respective first feature, determining said first distortion parameter, and determining said reference distortion model, are performed in a mode selected from the list consisting of:
   on-line; and
   off-line.

21. The method according to claim 16, further comprising a preliminary procedure of converting a signal produced by an image sensor acquiring an image of said object, from analog format to digital format.

22. The method according to claim 16, further comprising the procedures of:
   identifying a plurality of second features of an object in a second obstructed image of said object, said second obstructed image being acquired from said first image acquisition position;
   determining the apparent location of each of said second features according to said reference distortion model;
   identifying a plurality of third features in a third obstructed image for respective ones of said second features, said third obstructed image being acquired from a second image acquisition position behind said optically distorting medium, said third obstructed image being respective of said object;
   determining a second distortion parameter according to each of said apparent locations, respective ones of said third features, and a relative position between said first image acquisition position and said second image acquisition position; and
   determining a dynamic distortion model for said optically distorting medium respective of said second image acquisition position, according to said second distortion parameters.

23. The method according to claim 22, further comprising a preliminary procedure of acquiring said second obstructed image.

24. The method according to claim 22, further comprising a preliminary procedure of acquiring said third obstructed image.

25. The method according to claim 22, further comprising a preliminary procedure of determining said relative position.

26. The method according to claim 25, further comprising a preliminary procedure of determining said first image acquisition position.

27. The method according to claim 25, further comprising a preliminary procedure of determining said second image acquisition position.

28. Method for determining a distortion model for an optically distorting medium, the method comprising the procedures of:
   detecting a first obstructed image of a first feature in a first known target located in front of said optically distorting medium, at a first location, a first finite distance apart from an image sensor located behind said optically distorting medium;
   determining an obstructed viewing direction respective of said first feature, relative to a horizontal axis, according to said first obstructed image;
   detecting a second obstructed image of a second feature on a second known target, at substantially the same obstructed viewing direction, said second known target being located at a second location a second finite distance apart from said image sensor, in front of said optically distorting medium;
   determining a feature pair direction between said first feature and said second feature, according to coordinates of said first feature and said second feature, said first finite distance and said second finite distance; and
   determining said distortion model, according to said obstructed viewing direction and said feature pair direction.

29. The method according to claim 28, further comprising a preliminary procedure of placing said optically distorting medium in front of said image sensor.

30. The method according to claim 28, wherein said second known target is obtained by moving said first known target from said first location to said second location.

31. The method according to claim 28, wherein said coordinates of said second feature are determined by interpolating between a plurality of predetermined coordinates in said second known target.

* * * * *